Oct. 4, 1938.   E. L. BARTHOLOMEW   2,132,373
METHOD OF MAKING HELICAL BLADES
Filed March 29, 1937
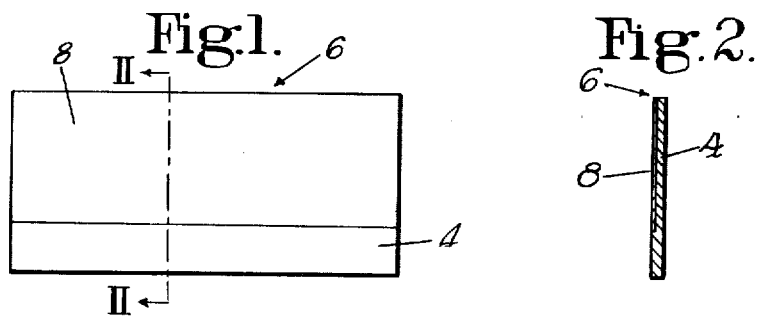
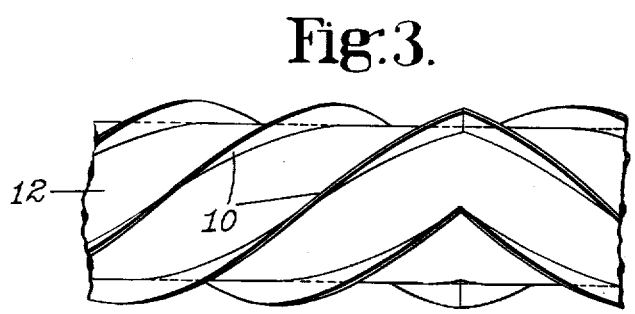

Patented Oct. 4, 1938

2,132,373

UNITED STATES PATENT OFFICE 2,132,373

METHOD OF MAKING HELICAL BLADES

Edward L. Bartholomew, Marblehead, Mass., assignor to The Turner Tanning Machinery Company, Portland, Oreg., a corporation of Maine Application March 29, 1937, Serial No. 133,501

6 Claims. (Cl. 148—12)

This invention relates to improvements in methods of making cutting tools from composite bars of alloy material. While the invention is illustrated with reference to the manufacture of helical blades from composite bars of steel alloys, it is to be understood that the invention and various important characteristics thereof may have other applications and uses.

Heretofore, the method commonly employed in manufacturing blades for bladed cylinders, such as fleshing and shaving machine blades having a relatively hard steel inlay (to serve as a cutting edge) in a softer steel body, has involved the step of curving a composite bar of suitable steel edgewise into a circular shape, after a preliminary heating to a suitable temperature. This circularly bent bar was then annealed to permit it to be formed into helical shape, the latter operation being carried out either in a separate machine specially provided for the purpose or by hand with the aid of a helically grooved cylinder. Following the helix forming operation, the blade was again heated to a relatively high temperature preliminarily to a quenching operation by which the blade was provided with a wear-resisting edge. Not infrequently it was necessary to reform the desired helical shape after the quenching operation, since quenching may cause some deformation of the blade. This method involved at least five, and often six, separate and distinct operations all more or less time-consuming and several of them requiring the exercise of skill and care.

It is an object of the invention to simplify and expedite the manufacture of cutters having a highly efficient wear-resisting cutting edge in which the cutting edge is backed by a softer and tougher layer formed integrally therewith. More particularly, it is an object of the invention to provide a new and improved method for the manufacture of helically shaped cutter and scraper blades suitable for use in bladed cylinders employed in the manufacture of leather.

To these ends, and in accordance with an important characteristic of the invention, suitable bars having a selected metal alloy for a cutting edge portion are heated to a temperature such that, after being formed into a helical shape necessary to blades for use on cylinders, the said blades or an edge portion thereof will air-harden, whereby only one heating of the bars is necessary as a preliminary to the formation from each bar of a helical blade having a properly hardened cutting edge portion.

Preferably, and as herein described, composite bars of air-hardening and non-air-hardening steel alloys in layers integrally united to each other are subjected to heat of such a temperature that, upon promptly forming the bars by simultaneous curving and other helix forming operations into blades of a helical shape, such blades will air-harden in that layer which forms the cutting edge of the blade and will thus be ready for use with or without a finishing touch.

These and other important characteristics of the invention will now be described in detail in the specification and then pointed out more particularly in the appended claims.

In the drawing,

Fig. 1 is a plan view of a composite bar of two steel alloys;

Fig. 2 is a transverse sectional view of the bar shown in Fig. 1; and

Fig. 3 is a side view of a cylinder having a helical blade in place thereon.

The invention is illustrated with reference to a cutter or scraper blade for use in connection with bladed cylinders commonly employed in the manufacture of leather. Preferably, and as illustrated, the blades are made from composite bars of steel alloys so that a hard or wear-resisting edge on one portion of a blade will be backed by a softer and tougher portion of the same blade. This softer and tougher portion is advantageous in that it facilitates proper and secure setting of the blade in a helical groove in the surface of a metal cylinder. Furthermore, the tougher metal affords a good firm backing for the cutting edge portion and thus tends to minimize breaking or cracking of the cutting edge. Upon reference to Figs. 1 and 2, it will be understood that a body portion 4 of a bar 6 is made of a relatively soft low carbon steel which may be a steel alloy having carbon .3, chromium .2, molybdenum .5, and vanadium .2, parts in the hundred. The composition just given is perhaps a somewhat higher grade metal than is really necessary. It errs, if at all, on the safe side. It air-hardens so little that it may properly be designated as non-air-hardening. It provides a good stiff backing for the cutting portion of the blade and has excellent toughness. Set in the body portion 4 as an integral portion of the bar 6 is a strip 8 of relatively high carbon air- or oil-hardening steel alloy which has preferably a carbon content of about 1.4% to 2.5%, and a chromium content of from 12% to 18% with small amounts of molybdenum, vanadium and nickel in the order of ½% to 1% of the latter three elements. Cobalt may be in the alloy in the order of .5% to 4.0%. For air-hardening this alloy should contain about 1½% carbon, the range being about 1.35% to 1.75%. Carbon of about 1.90% to 2.45% with 12 to 14.00% chromium may be quenched in oil to a suitable hardness.

The making of the bar shown in Figs. 1 and 2 starts with a slab, billet or ingot made up of the low carbon non-air-hardening steel, which is similar to that used for armor plate, having welded or cast in the middle of one side thereof a strip of air or oil-hardening steel which is normally much harder than the main body of the slab, billet, or ingot. This billet, slab or ingot of composite metal is rolled at a temperature such that the two bodies of steel alloy are fused as one and are correspondingly reduced in thickness during the rolling operation. Finally a strip of composite steel suitable for blades or scrapers is produced as a strip of about three inches in width and of a thickness of about $\frac{1}{16}''$. This is trimmed on its side edges and then split down the middle so that each of the strips thus made comprises a body of softer metal in which is embodied along one edge a strip of the harder metal, as shown in Fig. 2. This air-hardening high carbon steel alloy provides the cutting edge portion of the finished blade. It is markedly wear-resisting in comparison with the softer low carbon backing layer. Each bar made as a result of the described splitting operation is a flat strip of quadrilateral cross-section.

I have discovered that outstanding advantages follow the heating of a bar of substantially the composition described to a temperature of about 1900° F. to 2100° F., if the bar be promptly and quickly formed into a helix, since if the temperature be not allowed to drop much below 1400° F. during this forming operation, the blade thus formed will air-harden in its cutting edge portion in a few minutes. Upon heating the bar to a temperature within the range mentioned above, it will be found that the bar may be formed into a helically shaped blade without the formation of cracks in the cutting edge of the blade. In other words, the metal of the cutting edge is soft enough to flow under working pressure to furnish an extended and unbroken curved cutting edge. For instance, a machine for this work may apply pressure in greater degree along one edge of the bar thus causing that edge to become extended and curved. At substantially the same time the bar thus curved may be bent or pulled out sideways to make a helix from what would otherwise be a circular member. The necessary steps to make helical blades from bars are thus reduced to a minimum since, as the helically shaped blade comes from the forming machine, it drops on a suitable surface or into a receptacle and air-hardens. Furthermore, the temperatures given above have the additional advantage that little, if any, displacement of the softer layer around the cutting edge of the harder layer takes place. This is important since any such displaced metal obstructing the cutting edge would have to be removed by another operation. If the temperature be not allowed to drop much below 1400° F. at the end of the forming operation, there will be a period of three or four minutes before final hardening during which time the blade may if necessary be trued up or may be freed by cutting away any overflow of softer metal about said cutting edge. It is to be understood that the low carbon body layer does not air-harden to any substantial degree. These blades may be sand blasted to clean them, when they are ready for use. Upon reference to Fig. 3, a helical blade 10 made in the manner described is shown set in a groove of a cylinder 12.

It is an additional advantage of these blades that the hard steel forming the cutting edge is a semi-stainless steel, which is an important point in connection with the use of these blades upon hides or skins which have been subjected to various treating liquids having constituents likely to corrode ordinary iron or steel blades.

It is to be understood that some variation in the composition of the alloys is permissible and that the invention contemplates the use of high carbon high chrome material in the cutting edge which is not air-hardening but which may be readily hardened by methods well known in the industry, as by quenching in oil or other quenching mediums.

Having described my invention, what I claim as new and desire to secure by Letters Patent of the United States is:

1. That improvement in methods of making cutter blades of helical form with a cutting edge of air-hardened steel from a flat composite steel bar having an edge portion thereof composed of an air-hardening alloy steel, which comprises heating the bar to a temperature such that the air-hardening alloy steel will flow under forming pressure to provide an extended and unbroken convexly curved cutting edge, then with the bar substantially at the specified temperature forming it into a blade of a helical shape, maintaining the bar within a range of temperatures during the forming operation such that, at the end of the forming operation, the alloy steel will air-harden to the proper degree, and air-hardening the cutting edge of the blade.

2. That improvement in methods of making cutter blades which comprises heating a flat composite bar, containing a layer of relatively high carbon high chrome steel alloy set in and along an edge portion of a layer of softer low carbon steel alloy, to a temperature such that the high carbon alloy will flow when worked to provide an extended and unbroken convexly curved cutting edge, then, while maintaining approximately said temperature, promptly forming the bar into a blade of a helical shape, and then quenching the cutting edge.

3. That improvement in methods of making cutter blades which comprises heating a substantially flat composite bar, containing a layer of an air-hardening steel alloy set in and along an edge portion of a body of a softer non-air-hardening steel alloy, to a temperature within a range of about 1900° F. to 2100° F. such that the air-hardening alloy will flow when worked to provide an extended unbroken convexly curved cutting edge, then while the bar is within the specified range of temperatures promptly forming it into a blade of a helical shape, whereby there is formed at one operation in substantially completed condition a cutter blade in helical form having a portion which air-hardens, and then quenching the blade in air to harden the curved cutting edge.

4. That improvement in methods of making cutter blades which comprises heating a flat composite bar, containing a layer of a substantially non-air-hardening steel alloy and a layer of air-hardening high carbon steel located to furnish a cutting edge, to a temperature such that the material of the cutting edge will not crack upon extending and convexly curving said cutting edge in a helix forming operation at said temperature, while maintaining the temperature of the bar within a range of temperatures of from about 1400° F. to about 1900° F. performing the extending, curving and other helix forming operations upon said bar, and quenching the blade in air to harden said cutting edge.

5. That improvement in methods of making cutter blades which comprises heating a flat composite bar, containing a layer of high carbon steel alloy set in and along an edge portion of a layer of low carbon steel alloy, to a temperature such that a cutting edge formed on the high carbon steel will not crack upon lengthening and convexly curving said cutting edge during the formation of a helical blade from said bar, forming a helical blade from said bar while the temperature thereof is maintained within a range of from about 1400° F. to about 1900° F., and then quenching the blade in a suitable quenching medium to harden said cutting edge.

6. That improvement in methods of making cutter blades from a substantially flat composite bar of an air-hardening steel alloy set in and along an edge portion of a layer of softer non-air-hardening steel alloy, which comprises heating the bar to a temperature such that the air-hardening alloy will flow under forming pressure to provide an extended and unbroken convexly curved cutting edge, while the bar is at substantially the temperature specified promptly forming it into a blade of a helical shape by simultaneously curving and bending the bar, and then air-quenching said cutting edge portion, whereby there is formed from a composite alloy steel bar a cutter blade in helical form in substantially completed condition through a minimum number of operations.

EDWARD L. BARTHOLOMEW.